June 25, 1963 H. O. RIOPELLE 3,094,902
MOTOR CONTROL APPARATUS FOR CENTRALIZED LUBRICATOR
Filed Nov. 7, 1960 2 Sheets-Sheet 1

INVENTOR.
HARRY O. RIOPELLE
BY J. R. NELSON &
W. A. SCHAICH
ATTORNEYS

June 25, 1963  H. O. RIOPELLE  3,094,902
MOTOR CONTROL APPARATUS FOR CENTRALIZED LUBRICATOR
Filed Nov. 7, 1960  2 Sheets-Sheet 2
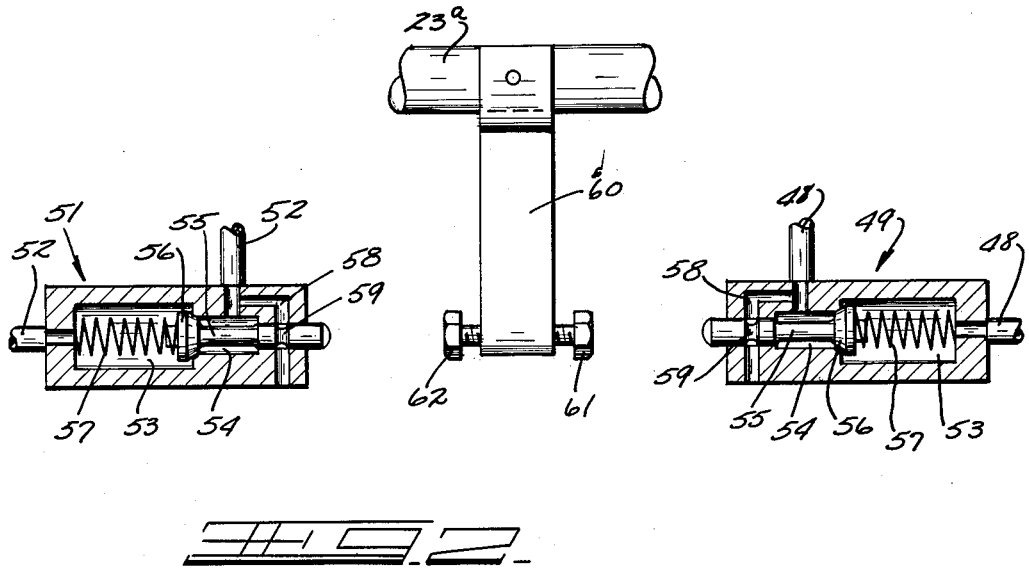
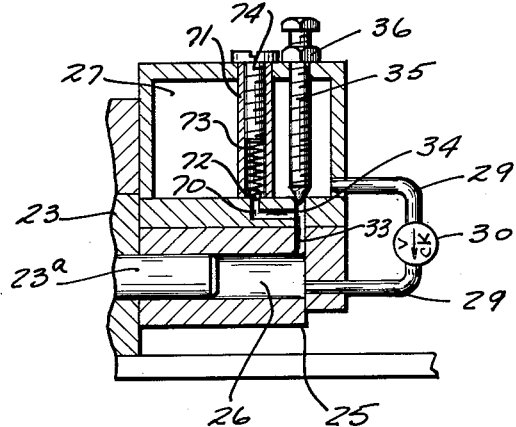
INVENTOR.
HARRY O. RIOPELLE
BY J. R. NELSON &
W. A. SCHAICH
ATTORNEYS

ㅤ

3,094,902
MOTOR CONTROL APPARATUS FOR CENTRALIZED LUBRICATOR
Harry O. Riopelle, Alton, Ill., assignor to Owens-Illinois Glass Company, a corporation of Ohio
Filed Nov. 7, 1960, Ser. No. 67,617
1 Claim. (Cl. 92—12)

This invention relates to a novel motor control for a reciprocating fluid pressure operated motor, and more particularly to such control for use in an automatic lubricator apparatus wherein the stroke of the motor in one direction may be timed by varying the rate of reciprocation of the motor over a wide range for delivering quantities of lubricant at timed intervals.

Generally, the control apparatus for prior forms of lubricator apparatus that provide for the delivery of the lubricant at intervals are complicated. In some of the prior devices, solenoid operated valves, relays and electrically operated timing mechanisms for intermittently metering and delivering the charges of lubricant are used.

It is an object of this invention to provide a control of the class mentioned that is hydraulic and fully automatic, yet efficient, of simple construction and capable of being economically manufactured.

Another object of the invention is to provide such motor control that is adjustable in its automatic cycle over a wide range in time between successive cycles.

Other objects and advantages over devices heretofore will appear from the following description, taken in conjunction with the accompanying drawings, partly in section, which illustrate the invention applied to a centralized lubricating system for supplying a number of machine elements with lubricant.

FIG. 2 is a sectional elevational view showing the reversing mechanism for the motor control.

FIG. 3 is a sectional elevational view, showing a second form of the motor control of the invention.

Figure 1:
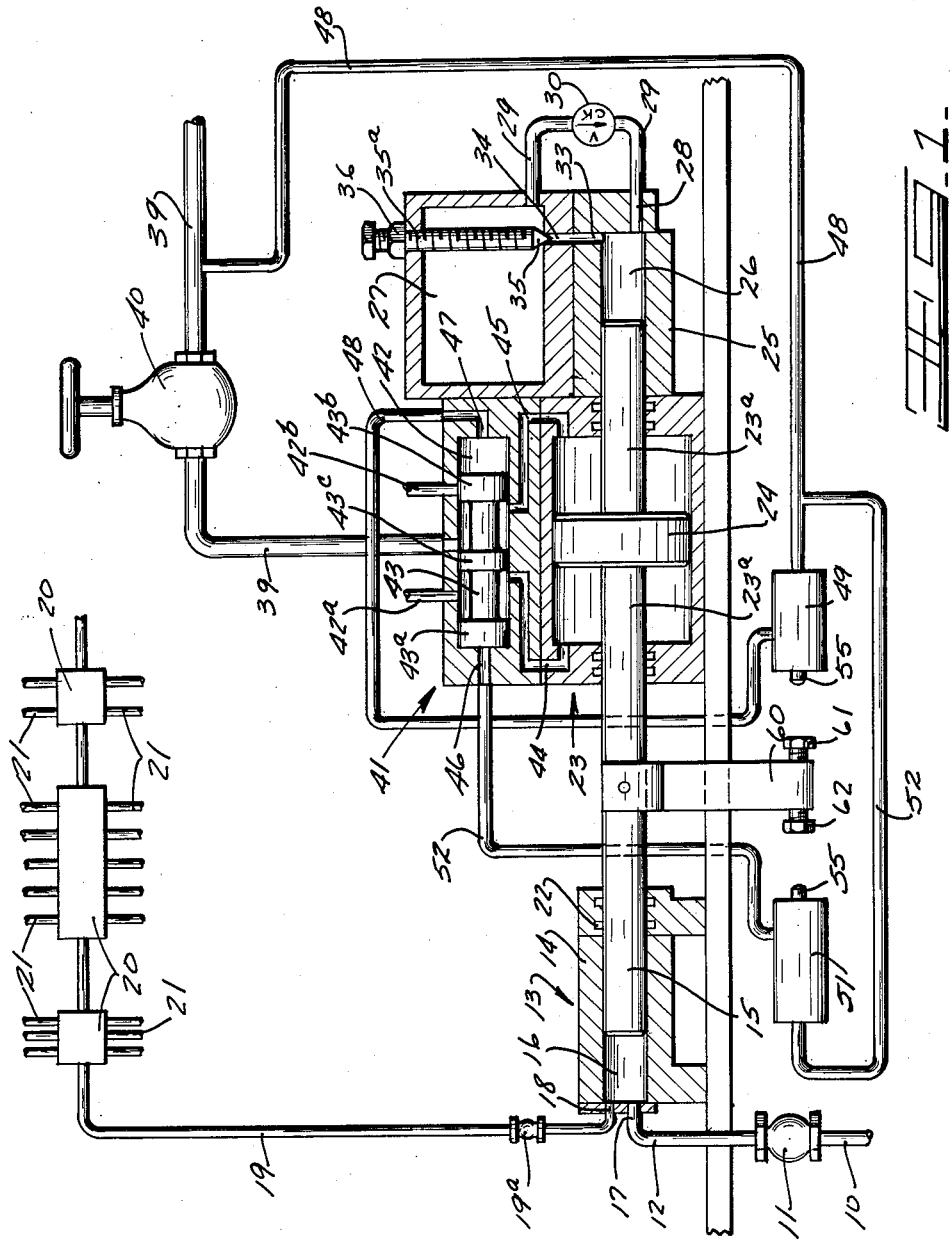
FIG. 1 is a sectional elevational view, in part schematic, showing the motor control apparatus of one form of the invention employed on a centralized lubricator system.

With reference to the drawings, the invention is shown utilized on a lubricator system wherein lubricant is supplied through line 10 connected to a sump (not shown), thence through a check valve 11 and the conduit 12. The lubricator pump 13 has a main housing 14 provided with the reciprocating pump piston 15 housed in a pump chamber 16. Conduit 12 is connected to one end of pump chamber 16 through inlet port 17. An outlet port 18 in pump chamber 16 is connected to a conduit 19, smaller in size than the delivery conduit 12, and extends to series connected distributor chambers 20. Along the length of conduit 19, prior to its connection to the first distributor chamber 20, is interposed a one-way check valve 19a permitting flow of fluid toward distributor chambers 20 only. Distributor chambers 20 have several outlet branches 21 leading to the various machinery elements which are to be lubricated (not shown).

The pump piston 15 extends through one end of the pump housing 14 and has a fluid tight gland by hydraulic packing 22 thereat.

Pump 15 is actuated by a fluid pressure actuated double-acting cylinder-piston assembly, referred to generally at reference number 23. The pump piston 15 is rigidly connected to the piston rod 23a of the cylinder-piston assembly 23 and carries a piston 24 thereon. The outer end of piston rod 23a extends into a housing 25 adjacent the cylinder-piston assembly 23. Housing 25 defines a fluid tight chamber 26 into which the outer end of piston rod 15 extends for reciprocating movement.

On FIG. 1, the first form of the invention includes a fluid reservoir 27, containing for example a hydraulic fluid, that is connected to an inlet port 28 of chamber 26 by fluid line 29. Fluid line 29 is provided with a check valve 30 permitting fluid flow in one direction only from the reservoir 27 to chamber 26. Initially, chamber 26 is filled with fluid from reservoir 27, and as the outer end of piston rod 15 reciprocates in one direction to increase the volume of chamber 26, fluid is drawn in chamber 26 to keep it filled by passage through line 29 and check valve 30 and inlet port 28. Chamber 26 is also provided with an outlet port 33 communicating with an exit passage 34, connecting to reservoir 27. A needle vavle 35 is inserted into the upper end of exit passage 34 to limit the flow of fluid in exit passage 34 as it is being forced out of chamber 26 by right-hand movement of piston rod 23a into chamber 26 on FIG. 1. Needle valve 35 is adjustable by threads 35a and held in its adjusted position by lock nut 36.

Thus, it is seen that the just described chamber 26 and fluid interchanged therethrough forms a means for yieldingly opposing movement of the piston rod 23a into the chamber 26, and likewise the displacement of fluid out of chamber 26 controls rate of the cycle of the piston 24 in its movement to the right during its driving action when it is operating the pump 13 for drawing lubricant through check valve 11 and conduit 12 into pump chamber 16.

The pump 13 is actuated by the double-acting cylinder-piston assembly 23, as previously mentioned, which receives pressure fluid in the form of air, steam or hydraulic fluid supplied from a source (not shown) connected to pipe 39. A pressure regulator and start-stop valve 40 is interposed in pipe 39. The pressure fluid from the source, after passing through a pressure regulator 40, enters a reversing valve, referred to generally at reference numeral 41. Reversing valve 41 has an internal chamber 42 and is provided with a valve-spool assembly 43 having end lands 43a and 43b and a central reversing cut-off land 43c. Valve spool 43 is adapted for reciprocating movement in chamber 42 and is actuated from fluid supplied through end-connected pilot lines, as will be presently described. Opposite the entrance of pipe 39 to chamber 42 of the reversing valve 41, are left-hand and right-hand fluid channels 44 and 45, respectively, which each communicate with opposite ends of the interior of the cylinder of cylinder-piston assembly 23. Pressure fluid, depending upon the positioned setting of valve spool 43, is permitted entry into the cylinder through one of fluid channels 44 or 45. If valve spool 43 is shifted to its left-hand position (as shown in solid outline on FIG. 1) the fluid channel 45 is connected to pipe 39 and pressure fluid then enters the right-hand side of the cylinder. If valve spool 43 is then shifted to its right-hand position, pressure fluid is permitted to enter fluid channel 44 and the left-hand side of the cylinder. In shifting from one setting to an alternative setting, the central land 43c shifts from one side to the other of the entrance of pipe 39 to valve chamber 42, and by so doing blocks chamber 42 between pipe 39 and either the left-hand or right-hand fluid channels 44 or 45.

Exhaust ports 42a and 42b are provided at opposite sides of the entrance of pipe 39 in valve chamber 42. The exhaust ports 42a and 42b are alternately connected to exhaust either channel 44 or 45 by adjacent end lands 43a and 43b of valve spool 43.

The setting of reversing valve 41 is fluid pressure actuated through pilot pressure introduced at opposite end ports 46 and 47 of reversing valve 41. Pilot pressure is applied against the end of land 43b of valve spool 43 by a connection of line 48 to a T-connection with pipe 39. A normally-closed valve 49 is interposed in line 48 between the port 47 and the pipe 39. Pilot fluid is supplied under pressure against the end of land 43a of valve spool 43 by a T-connection of pipe 52 with line 48 intermediate valve 49 and pipe 39. A normally-closed valve 51 is interposed in line 52 between this T-connection and end port 46 of valve 41. The valves 49 and 51 (FIG. 2) are correspondingly similar in construction and comprise a body that includes an internal chamber 53 connected with a bored chamber 54. A shiftable member 55 has a valve head 56 normally set by force of spring 57 to block the connection between chambers 53 and 54. The pressure side of lines 48 and 52 are connected to the respective chambers 53 of the valves. The lines 48 and 52 leading to reversing valve 41 are connected to chambers 54 of the respective valves. In their normally closed positions, as shown on FIG. 2, the valves 49 and 51 are set to exhaust by the passage 58 leading to atmosphere or a sump. Passage 58 in each valve extends through the slideway for member 55. Member 55 has a reduced annular grooved portion 59 that aligns across passage 58 when the valve member is set by spring 57 in the closed position. Thus, the pilot lines 48 and 52 are normally closed and the respective ends of chamber 42 of reversing valve 41 are normally connected to exhaust through valves 49 and 51.

An outward projecting portion of member 55 is provided for engagement with a T-shaped element 60 bolted on piston rod 23a to be carried in reciprocating movement thereby. Two studs 61 and 62 are threaded on opposite sides of element 60 and aligned to make engagement with the outwardly projecting end of member 55 of valves 49 and 51 to actuate their members 55. As the member 60 carries studs 61 or 62 towards the opposite extremities of reciprocatory travel, they will engage one of their respective members 55 and open one of the valves 49 or 51.

Thus, as the piston rod 23a moves in one direction, for example to the right on the drawing, the member 60 and stud 61 thereon serve as a means responsive to this reciprocating movement of the motor to engage the valve 49 and shift it from its normally-closed position to open a passage for pilot fluid through line 48. Pilot fluid under pressure is thus applied against land 43b of reversing valve 41 and valve spool 43 is thereby shifted to the left. Fluid in chamber 42 to the left of land 43a is exhausted through line 52, valve 51, which is normally set to exhaust. As valve spool 43 shifts to the left, central land 43c shifts the connection of pipe 39 from channel 44 to channel 45. At the same time, land 43a connects exhaust port 42a and channel 44 and land 43b blocks exhaust port 42b so that pressure fluid from pipe 39 then enters the opposite side of the motor cylinder and fluid from the left side of the cylinder is exhausted through channel 44 and exhaust port 42a. The direction of movement of piston 24 of the motor is thus reversed.

Similarly, as the piston rod 23a carrying member 60 moves sufficiently in the other direction (to the left on the drawing), the stud 62 will engage with the outward portion 55 of valve 51 and shift its internal valve member 55 from its normally-closed position to open a connection for pressurized fluid line between the left end of valve chamber 42. Thus, the valve spool 43 is again shifted to the right and the direction of actuating movement of the cylinder-piston assembly 23 is reversed, whereby pressure fluid is routed to channel 44 and fluid is exhausted from the other side of the motor cylinder through channel 45.

The member 60 is constructed so that its studs 61 and 62 are adjustable laterally thereon. By laterally adjusting the position of 61 or 62 or both on member 60, the length of stroke of the piston of motor 23 may be adjusted as needed.

The motor may be operated by a cycle that is variable in time. One of the novel features of the invention, therefore, resides in the control apparatus, above described, which limits the rate of movement of the motor piston 24 in the pumping direction or toward the right in FIG. 1. By adjusting the needle valve 35, this rate of movement may be varied over a wide range. It has been found that a complete reciprocating cycle of piston 24 may be varied from a few seconds to several hours by the metering of fluid displaced in chamber 26 through the needle valve 35 during the pumping stroke of the pump apparatus driven. This combination provides a yieldable means opposing the movement of the piston 24 during the time it is operating to pump or measure a charge of lubricant. The amount of this opposition is adjustable, at will, to increase or decrease the time interval required between the consecutive applications of the charge of lubricant to the machinery elements. Once the pilot valve has been tripped to reverse the driving direction of motor 23, the piston 24 acts against the force of the resistance presented by the load it is driving, which in this case is the lubricator pump 13 applying charges of lubricant through its outlet 18, 19, distributing chambers 20 and conduits 21 to the machine elements to be lubricated.

A further variant of the invention is shown on FIG. 3. This provides a safety feature in the above described motor control. In the event that needle valve 35 malfunctions, for example by its closing off exit passage 34 entirely, a safety device is provided through a fluid connection in channel 70 connecting between exit passage 34 below needle valve 35 and the interior of reservoir 27. To control the pressure in chamber 26, the channel 70 is provided with a spring loaded ball check valve assembly 71 having a predetermined pressure opening setting. The assembly 71 has a ball 72 seated over passage 70 biased by a spring 73. The pressure applied by spring 73 may be varied by the adjustment of screw 74 in assembly 71. If the valve assembly 71 opens, fluid will flow past ball 72 unseating it and into the housing of assembly 71. This housing is constructed so that it is vented or in communication with chamber 27.

Having described the invention in its preferred forms, it should be understood that various modifications may be resorted to, without departing from the principles of the invention, which are deemed to be limited only by the scope of the appended claim.

I claim:

Automatic time control apparatus for a reciprocating motor that is adapted to be operated cyclically for driving a load device comprising a member connected to the motor and mounted for reciprocating movement thereby, said movement of the member in one direction being restricted by the load device, and yieldable means opposing the movement of said member in the opposite direction comprising a fluid chamber housing one end of said member for axial movement therein, a reservoir containing fluid, an operative fluid connection extending from the reservoir to said chamber and permitting only reservoir-to-chamber flow therethrough, an operative fluid connection extending from the said chamber to the reservoir, a valve in said last-mentioned fluid connection adjustable for, at will, varying the rate of fluid flow from said chamber, thereby controlling the rate of movement of said member into said chamber, the amount of opposition of said movement being adjustable by said valve in varying the rate of fluid flow from said chamber to thereby either increase or decrease the time interval required for one complete reciprocatory cycle of the motor, and a safety device connected to said chamber comprising a fluid connection to the reservoir and spring loaded ball check valve having a predetermined pressure-opening setting, said check valve being interposed in said connection to normally block passage of fluid therethrough whenever the pressure in said reservoir to chamber connection is less than the pressure required for opening said check valve.

References Cited in the file of this patent

UNITED STATES PATENTS

| | | |
|---|---|---|
| 1,998,873 | Kingsbury | Apr. 23, 1935 |
| 2,699,018 | Carman | Jan. 11, 1955 |
| 2,781,026 | Schlatter et al. | Feb. 12, 1957 |

FOREIGN PATENTS

| | | |
|---|---|---|
| 493,380 | Great Britain | Oct. 7, 1938 |
| 608,814 | Great Britain | Sept. 21, 1948 |